(12) United States Patent
Fender et al.

(10) Patent No.: US 11,269,874 B2
(45) Date of Patent: Mar. 8, 2022

(54) TWO-VALUED LOGIC PRIMITIVES FOR SQL QUERY PROCESSING

(71) Applicant: Oracle International Corporation, Redwood Shores, CA (US)

(72) Inventors: Pit Fender, Union City, CA (US); Benjamin Schlegel, Merced, CA (US); Alexander Ulrich, Freiburg (DE)

(73) Assignee: Oracle International Corporation, Redwood Shores, CA (US)

( * ) Notice: Subject to any disclaimer, the term of this patent is extended or adjusted under 35 U.S.C. 154(b) by 104 days.

(21) Appl. No.: 16/823,632

(22) Filed: Mar. 19, 2020

(65) Prior Publication Data

US 2021/0294795 A1    Sep. 23, 2021

(51) Int. Cl.
*G06F 16/245* (2019.01)
*G06F 16/2453* (2019.01)

(52) U.S. Cl.
CPC ...... *G06F 16/245* (2019.01); *G06F 16/24542* (2019.01)

(58) Field of Classification Search
CPC ............. G06F 16/245; G06F 16/24534; G06F 16/24542; G06F 16/2455; G06F 16/24553; G06F 16/24558
See application file for complete search history.

(56) References Cited

U.S. PATENT DOCUMENTS

| 5,367,675 | A | * | 11/1994 | Cheng | G06F 16/24544 |
| 5,590,324 | A | * | 12/1996 | Leung | G06F 16/24537 |
| 5,905,982 | A | * | 5/1999 | Carey | G06F 16/289 |
| | | | | | 707/694 |
| 6,996,557 | B1 | * | 2/2006 | Leung | G06F 16/24537 |
| 7,739,219 | B2 | * | 6/2010 | Liu | G06F 16/24537 |
| | | | | | 707/713 |
| 2006/0053131 | A1 | * | 3/2006 | Meijer | G06F 8/31 |
| 2007/0050380 | A1 | * | 3/2007 | Meijer | G06F 8/31 |
| 2008/0154841 | A1 | * | 6/2008 | Reichart | G06F 16/24537 |

(Continued)

OTHER PUBLICATIONS

Zhou et al., "Implementing Database Operations Using SIMD Instructions", ACM SIGMOD '2002 Jun. 4-6, 2002 Madison, Wisconsin, USA, 12 pages.

(Continued)

*Primary Examiner* — James E Richardson
(74) *Attorney, Agent, or Firm* — Hickman Becker Bingham Ledesma LLP; Brian N. Miller

(57) ABSTRACT

The present invention relates to data manipulation language (DML) acceleration. Herein are database techniques to use value range analysis and range-limited execution operators when a value is excluded. In an embodiment, a computer receives a data access request that specifies an expression that includes operator(s), including a particular operator that has argument(s) that has only three possible values. Before detecting the actual value of a particular argument, the computer detects that a particular value of the three possible values is excluded for the particular argument. Responsively, an implementation of the particular operator that never accepts the particular value for the particular argument is selected. Applying the expression to fulfil the data access request entails invoking the selected implementation of the particular operator.

20 Claims, 6 Drawing Sheets

(56) References Cited

U.S. PATENT DOCUMENTS

2011/0078134 A1\* 3/2011 Bendel .................... G06F 16/22
707/713
2018/0075105 A1 3/2018 Chavan et al.
2019/0079974 A1\* 3/2019 Goergens .......... G06F 16/24524

OTHER PUBLICATIONS

Moerkotte, Guido, "Buildings Query Compilers", dated Mar. 5, 2019, Chapter 5, 5 pages.
Modern SQL, "The Three-Valued Logic of SQL", dated Jan. 19, 2020, 12 pages.
Eich et al., "Faster Plan Generation through Consideration of Functional Dependencies and Keys", Proceedings of the VLDB Endowment, vol. 9, No. 10, dated 2016, 12 pages.
Moerkotte,Guido, "Building Query Compilers", dated Mar. 5, 2019, Chapter 5 Only, 714 pages.
Graete, Goetz, "Query Evaluation Techniques tor Large Databases", ACM Computing Surveys 25(2), only sections 10.2-10.3 and 12.4 dated Nov. 10, 1993, 168 pages.

\* cited by examiner

TWO-VALUED LOGIC PRIMITIVES FOR SQL QUERY PROCESSING

FIELD OF THE INVENTION

The present invention relates to data manipulation language (DML) acceleration. Herein are database techniques to use value range analysis and range-limited execution operators when a value is excluded.

BACKGROUND

The American National Standards Institute (ANSI) structured query language (SQL) standard as well as any other proprietary SQL dialects are based on a three-valued logic consisting of True, False, and Unknown. Three-valued logic is needed to handle NULL values. The Boolean value of NULL is mapped to Unknown. Herein, NULL, Null, and null may be synonymous.

Unknown should be mapped to either True or False for database operators for relational algebra or relational calculus that evaluate a condition, such as for operators such as filters, grouping, distinct, and sort. Join and local predicates are usually Null rejecting. Null rejecting means that the predicate evaluates to False if attributes referenced by the predicate contain a Null. Synonyms for Null rejecting are Null intolerant, strong, or strict.

The following are some example predicate types:
A table scan with a local predicate may be known as a Column to Constant filter, for which a null may occur as the constant or in values of the referenced attribute. When null occurs, the filter condition is evaluated to Unknown, which means that the row is filtered by the predicate. In other words the row is rejected, which is known as a null rejecting predicate.
A table scan with a Column to Column Filter, for which a null may occur in one, some, or all of the values pertaining to any referenced column, in which case the whole filter condition is evaluated to Unknown. This means the row is rejected, which is filtered out.
Equi-join predicates are similar to Column to Column filters and are treated the same.
Compound predicates that can be decomposed into the above predicates by conjunction, disjunction, and/or negation are evaluated similarly so long as they are null rejecting.

Any SQL compliant database management system (DBMS) implements three-value logic. For example for the equal comparison operator, this means that the operator has to check the following conditions:
1. the left-hand input and the right-hand input are equal,
2. the left-hand input is not Null and
3. the right-hand input is not Null.

Only if all three above conditions hold, the result is True. The result is False as soon as any of the conditions does not hold. Null handling is implemented by conditions 2-3 above. Depending on the Null-value representation, another column or bitmap needs to be checked in order to detect whether or not the current value is Null.

Because SQL expressions may need a three-valued logic, the evaluation of predicates is not straightforward. For example, an equi-join predicate such as $R_1.a=R_2.b$ may occur for the following two relational tables R1-2 whose respective possible values are as follows.

| | $R_1 \cdot a$ |
|---|---|
| 1 | 1 |
| 2 | Null |

| | $R_2 \cdot b$ |
|---|---|
| 1 | 1 |
| 2 | 2 |
| 3 | Null |

In the above relational tables $R_{1-2}$, the left column is demonstrative only and indicates an implied row number. The following Table 1 shows how each possible population of input values is evaluated for a Null rejecting predicate $R_1.a=R_2.b$.

| | $R_1 \cdot a$ | $R_2 \cdot b$ | result |
|---|---|---|---|
| 1 | 1 | 1 | true |
| 2 | 1 | 2 | false |
| 3 | 1 | Null | false |
| 4 | Null | 1 | false |
| 5 | Null | 2 | false |
| 6 | Null | Null | false |

Any occurrence of a Null value is evaluated to False, according to the definition of Null rejecting. Even the comparison of two Null values evaluates to False, as shown with row number 6 above, which may be counterintuitive. Thus, evaluating predicates is not as straightforward as merely comparing values to each other.

As the above examples demonstrate, three value logic is more expressive than two value logic. Thus, three value logic needs more flexibility, which may increase latency. Because three value logic is more complicated than Boolean logic, more machine instructions may need execution, and control flow branches may be more frequent. As discussed later herein, three value logic such as for null rejecting predicates is slow due to CPU pipeline stalls and failures of branch prediction and speculative execution.

DETAILED DESCRIPTION

Figure 1:
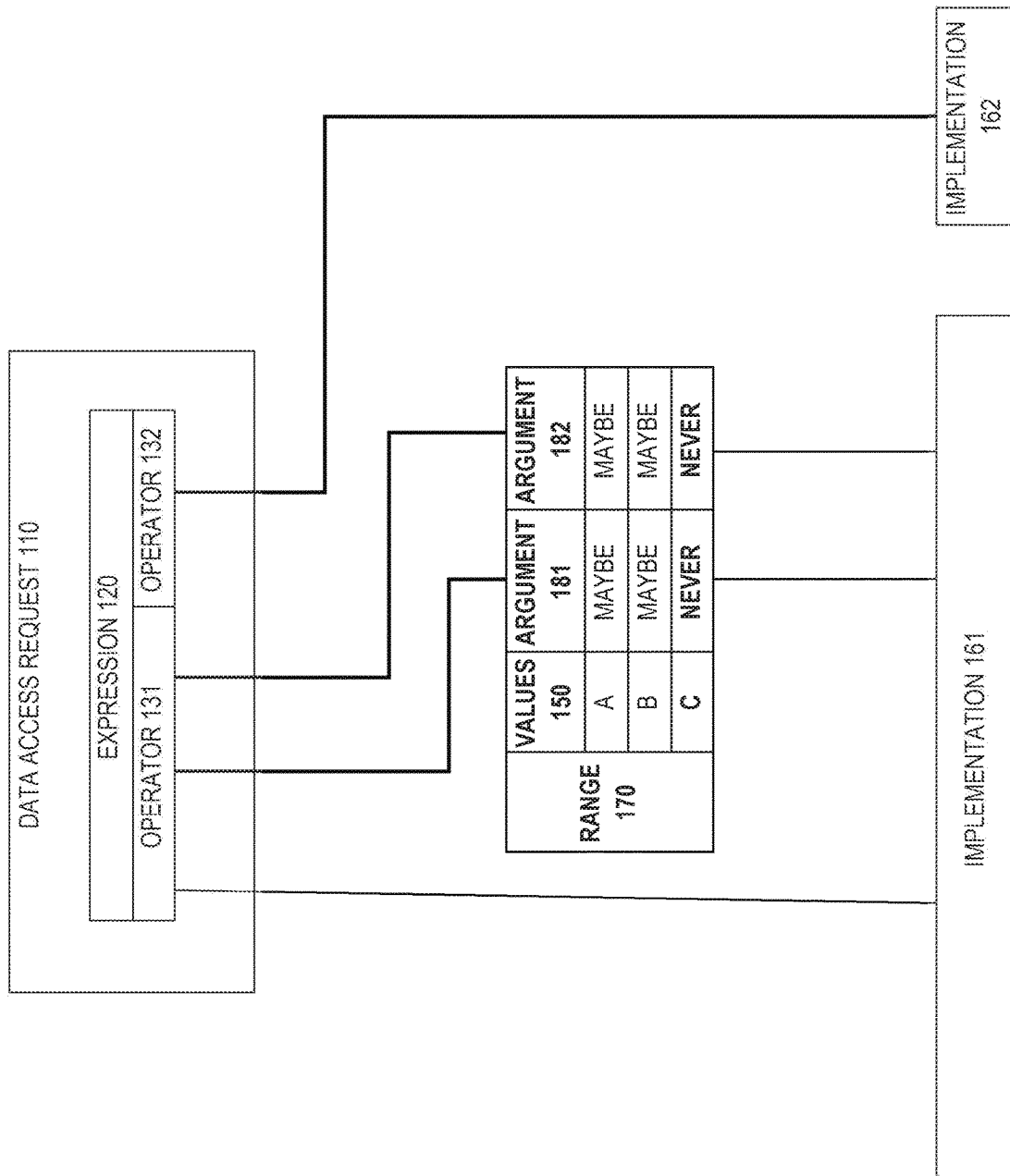
FIG. 1 is a block diagram that depicts an example computer that uses value range analysis and, when a value is excluded, range-limited execution operators that accelerate an example data access request.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In order to be structured query language (SQL) compliant a relational database management system (RDBMS) typically implements a three-valued logic with the burden of handling null values in expressions or predicates. As discussed later herein, there are important ways of representing null values. One is through domain encoding that directly includes null as a value. Another way is by using an extra column or a bitmap to indicate null. Using a two-valued logic instead of a three-valued logic eliminates a need for cross-referencing the extra column or bitmap. Even when domain-encodings are used, two-valued logic primitives eliminate the need for an extra comparison for a referenced attribute, constant, or other value. Because there is no hardware support for three-valued logic primitives they are much more expensive to evaluate as compared to evaluation by corresponding two-valued logic primitives.

Approaches herein invoke two-valued logic at run-time based on value range analysis at compile-time that detects if using two-valued logic could have an identical query result, such as for Transaction Processing Performance Council (TPC) H Benchmark. In common scenarios, a substantial overhead is spent on preventive measures to handle potential null values correctly, although none of the underlying table data contains null values, and no queries reference or produce any null values.

Accordingly, approaches herein use two-valued logic wherever possible. Herein are two example algorithms that may be applied in sequence to detect, at compile-time of a SQL query, whether or not a logical expression or subexpression can be flagged as suitable for two-valued-logic. For example, such compile-time decisions may be based on database schematic constraints of persistent data and/or a value range analysis of logical expressions of the query. Logical expressions and sub-expressions of an operator tree of a parsed query may be analyzed, including detecting which operators can be evaluated with two-valued logic. At run-time the query evaluation framework then selects a corresponding operator implementation as described herein.

Some approaches herein include:
1. two-valued logic primitives for each three-valued logic counterpart;
2. a hybrid approach that uses two valued logic operators wherever possible;
3. use of schema information to determine if an underlying table column can contain null values;
4. in case the schema information is not available, deduce constraint information at load time, whenever applicable;
5. an algorithm that uses nullability column information to infer value ranges for each referenced attribute in a predicate;
6. an algorithm that uses the deduced nullability characteristics to mark any logical operation in a predicate as two-valued or three-valued-logic; and
7. at run-time of the query, use two-valued operators whenever an expression or subexpression is designated as suitable for such.

In an embodiment, a computer receives a data access request that specifies an expression that includes operator(s), including a particular operator that has argument(s) that has only three possible values. Before detecting the actual value of a particular argument, the computer detects that a particular value of the three possible values is excluded for the particular argument. Responsively, an implementation of the particular operator that never accepts the particular value for the particular argument is selected. Applying the expression to fulfil the data access request entails invoking the selected implementation of the particular operator.

1.0 Example Representation of Null Values

The following are two alternative approaches to represent Null values:

Null values can be domain encoded. That is, one specific and predefined value from the domain is reserved in order to represent Null. For example, the Oracle RDBMS treats the empty string as Null value.

Extra Column, Flag or bitmap to encode which of a column's values are Null.

Both of the above approaches have advantages and disadvantages as follows. Domain encoding has two disadvantages. First a value is taken out of the domain, which makes the domain smaller than ANSI-SQL allows for. Second, for composited types such as numbers with an exponent the encoding problem becomes harder. For example, subsequent numeric values in a column may be stored in a same data chunk, such as an in memory compression unit (IMCU), should be encoded with a same exponent. Null values may necessitate an exponent change, which may be disruptive. An advantage of domain encoded values is that no space is wasted.

Alternatives such as an extra column, flag, or bitmap may waste space. Furthermore, it might not be straightforward how to encode intermediate results, such as when a subexpression produces null values. A benefit of alternatives instead of domain encoding is that no value within the domain needs to be reserved, and the full domain of values is available.

Null rejecting predicates may need special analysis as presented herein. That means that a DBMS should not always resort to two valued logic. Instead the evaluation of logical expressions is more complicated as indicated in the following truth tables 2-4 that are respectively for AND, OR and NOT. Hence the evaluation of logical expressions for three-value logic is more expensive to execute than the evaluation of two-valued logic.

The top row and left column of truth tables 2-4 are two axes shown bold. Truth table 2 has Three Valued Logic for an AND operator as follows.

Truth table 3 has Three Valued Logic for an OR operator as follows.

| OR | False | Unknown | True |
|---|---|---|---|
| False | False | Unknown | True |
| Unknown | Unknown | Unknown | True |
| True | True | True | True |

Truth table 4 has only one axis. Truth table 4 has Three Valued Logic for an NOT operator as follows.

| NOT | |
|---|---|
| False | True |
| Unknown | Unknown |
| True | False |

| AND | False | Unknown | True |
|---|---|---|---|
| False | False | False | False |
| Unknown | False | Unknown | Unknown |
| True | False | Unknown | True |

2.0 Example Computer and Data Access Request

FIG. 1 is a block diagram that depicts an example computer 100 and an example data access request 110, in an embodiment. Computer 100 uses value range analysis and, when a value is excluded, range-limited execution operators that accelerate data access request 110. Computer 100 may be at least one rack server such as a blade, a personal computer, a mainframe, a virtual computer, or other computing device. When computer 100 comprises multiple computers, the computers are interconnected by a communication network.

In various embodiments, computer 100 provides access to a bulk datastore such as a relational database, a graph database, a NoSQL database, a column datastore, a tuple datastore such as a resource description framework (RDF) triplestore, a key value datastore, or a document datastore such as for documents that contain JavaScript object notation (JSON) or extensible markup language (XML). In any case, the datastore may be managed by software such as an application or middleware such as a database management system (DBMS).

In an embodiment, data stored in the datastore is persistent. In an embodiment, some or all data stored in the datastore resides in random access memory (RAM).

In operation, computer 100 receives or generates data access request 110 to read and/or write data in the datastore. In embodiments, data access request 110 is expressed as data manipulation language (DML) such as a create read update delete (CRUD) statement or query by example (QBE). For example, data access request 110 may be a structured query language (SQL) DML statement such as a query. In an embodiment, data access request 110 is received through open database connectivity (ODBC).

Data access request 110 contains or otherwise includes expression 120 that may be simple or compound. For example, expression 120 may be for filtration, projection, or aggregation of data. For example, expression 120 may be the predicate of a WHERE clause of a SQL query.

Expression 120 is compound when expression 120 includes multiple data operators such as 131-132 as shown. Operators 131-132 are generalized such that each operator has its own one or two implementations. Execution of data access request 110 by computer 100 begins by interpreting and/or compiling: data access request 110, expression 120, and operators 131-132. Each operator 131-132 is matched to a respective implementation 161-162 that actually performs data processing to fulfil the operator.

An operator may produce as output and/or accept, as input, data of some datatype. For example as shown, operator 131 accepts arguments 181-182 as inputs. Which data, values, and datatype occur for input(s) and/or output(s) of an operator may depend on factors such as inputs, datastore content, data schema, and/or semantics of the operator. For example, a SQL operator such as IS NULL or NVL may produce an output that, in some cases, will exclude null. In some cases, value range analysis may be incomplete due to limited information and/or time. For example, computer 100 may sometimes be unable to detect which datatype and/or values will an operator produce or consume for data access request 110.

Operator 132 may produce and consume same or different amounts, types, and value ranges of data than operator 131. In an example, some or all outputs of operator 132 may be inputs to operator 131. For example, argument 181 and/or 182 may be produced by operator 132 and consumed by operator 131.

An operator may produce some or all of the data it consumes. For example, operator 132 may consume a relational column as an argument and produce that same column as argument 181 as input to operator 131.

An operator may have one or two implementations, which are substitutes for each other, but only one implementation is used for a given operator of a given data access request. If there is only one implementation, it is generalized to accept a full range of values for each datatype accepted by each argument of the implementation. If there is a second implementation, it is specialized for acceleration and excludes a value for at least one argument.

Thus, which implementation is selected by computer 100 to implement operator 131 may depend on value range analysis of argument 181 and/or 182. Computer 100 may dynamically select faster implementation 161 based on value range analysis that occurs ahead of time such as during planning, optimization, or compilation of data access request 110 or just in time, which is more or less immediately before execution of an already compiled request. In any case, value range analysis may be applied to schematic metadata, content data, data statistics, and/or usage statistics.

As shown, implementations 161-162 are not substitutes for each other but instead are respective implementations selected for different operators 131-132. Operator 131 also has a general implementation that is slower than implementation 161 and is not used and not shown.

Best implementation 161 should be the fastest. However, such a specialized implementation may have usage restrictions that sometimes preclude selection of that implementation. For example, an operator also has a fall back implementation that is slow but always applicable.

As shown and with insufficient or no value range analysis, argument 181 generally has possible values A-C. With sufficient value analysis of range 170 such as discussed later herein, computer 100 may detect that, for data access request 110, argument 181 can only possibly be value A or B but not C.

Implementation 161 is fast but has a usage restriction of not accepting value C for argument 181. When value range analysis reveals that argument 181 excludes value C, computer 100 detects that implementation 161 can accept argument 181. Thus, computer 100 may use special implementation 161 to accelerate data access request 110.

In one example, operator 131 produces an output that operator 132 consumes as an input for which value range analysis may detect that the input also has value range 170 and also excludes value C based on: a) detection that argument 181 excludes value C, b) semantics of operator 131, c) selection of implementation 161, and/or d) value range analysis of argument 182. In other words, value range analysis may sometimes have a transitive effect that propagates detected datatypes and excluded values between connected operators. For example even though operator 132 does not receive argument 181, value range analysis of argument 181 may facilitate selection of a special implementation for operator 132.

In one example, operators 131-132 are separate usages of a same logical operator. Because the respective contexts of operators 131-132 within expression 120 are different, the respective inputs to operators 131-132 may differ. Thus, respective value range analysis may differ for operators 131-132. Thus even though operators 131-132 have the same logical operator, same or different respective implementations may be selected as shown.

3.0 Example Operator Implementation Selection

Figure 2:
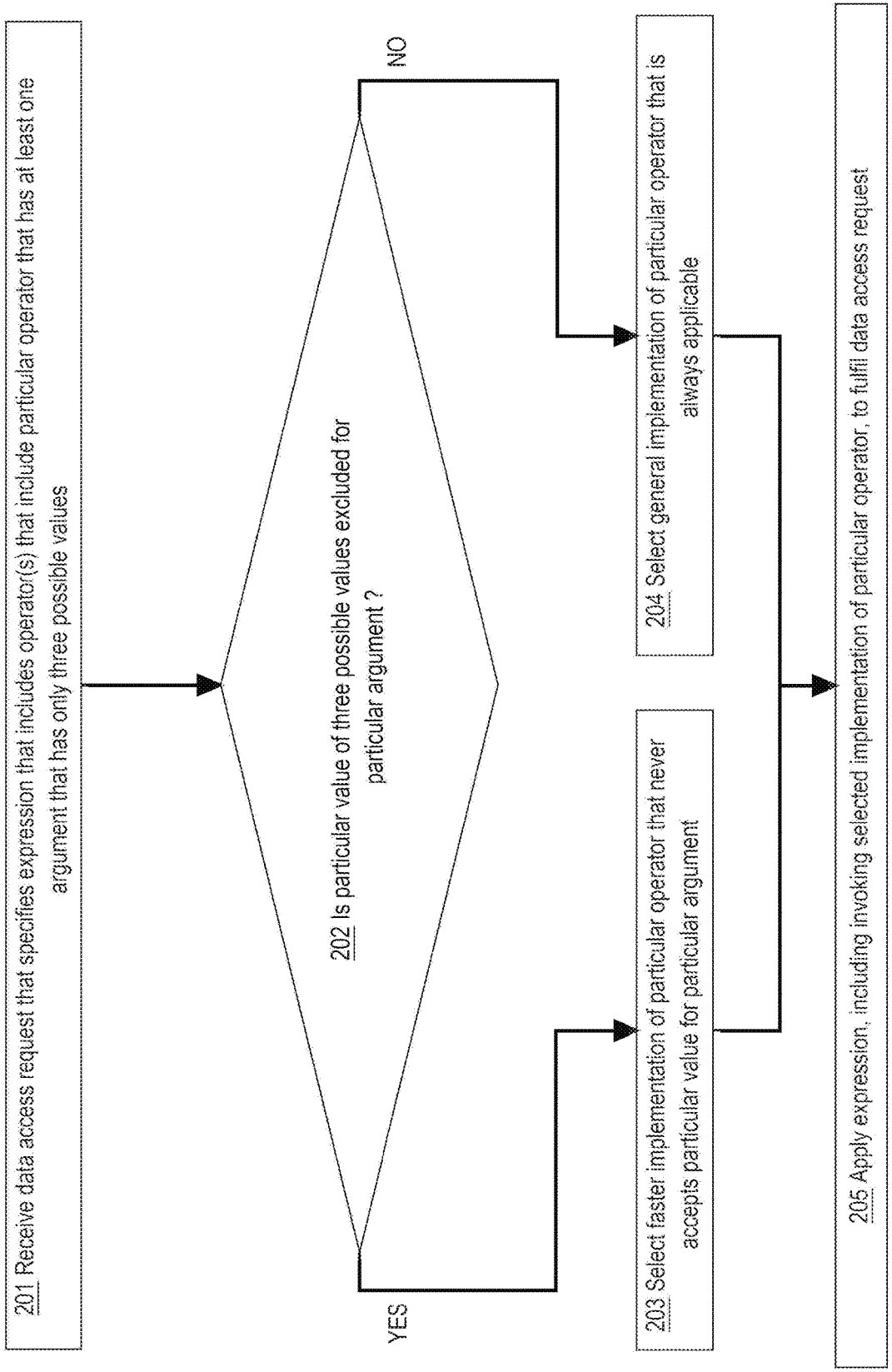
FIG. 2 is a flow diagram that depicts an example process for using value range analysis and a range-limited operator implementation to accelerate a data access request.

FIG. 2 is a flow diagram that depicts an example process that uses value range analysis and range-limited operator implementation 161 to accelerate data access request 110. FIG. 2 is discussed with reference to FIG. 1.

Step 201 receives data access request 110 that specifies expression 120 that includes operators 131-132. Operator 131 has arguments 181-182 that generally have only three possible values A-C. For example, data access request may be a query, and expression 120 may be a filter predicate.

Before detecting the actual value of each argument 181-182, step 202 detects whether or not particular value C is excluded for arguments 181-182. For example, value range analysis may be applied to arguments 181-182. For example, arguments 181-182 may conduct a same or different Boolean column of a relational table, and value C may be indicated as excluded by a relational schema or an encoding dictionary.

If step 202 detects that value C is excluded, then step 203 occurs. Otherwise, step 204 occurs.

Step 203 selects faster implementation 161 of particular operator 131 that never accepts particular value C for particular argument 181. For example, logic of implementation 161 may be streamlined because value C is not accommodated. Whereas, step 204 instead selects a general implementation of operator 131 as a slower fall back that is always applicable.

Step 205 applies expression 120, including invoking the selected implementation of particular operator 131, to fulfil data access request 110. When faster implementation 161 is used, data access request 110 is accelerated.

4.0 Example Operator Tree

Figure 3:
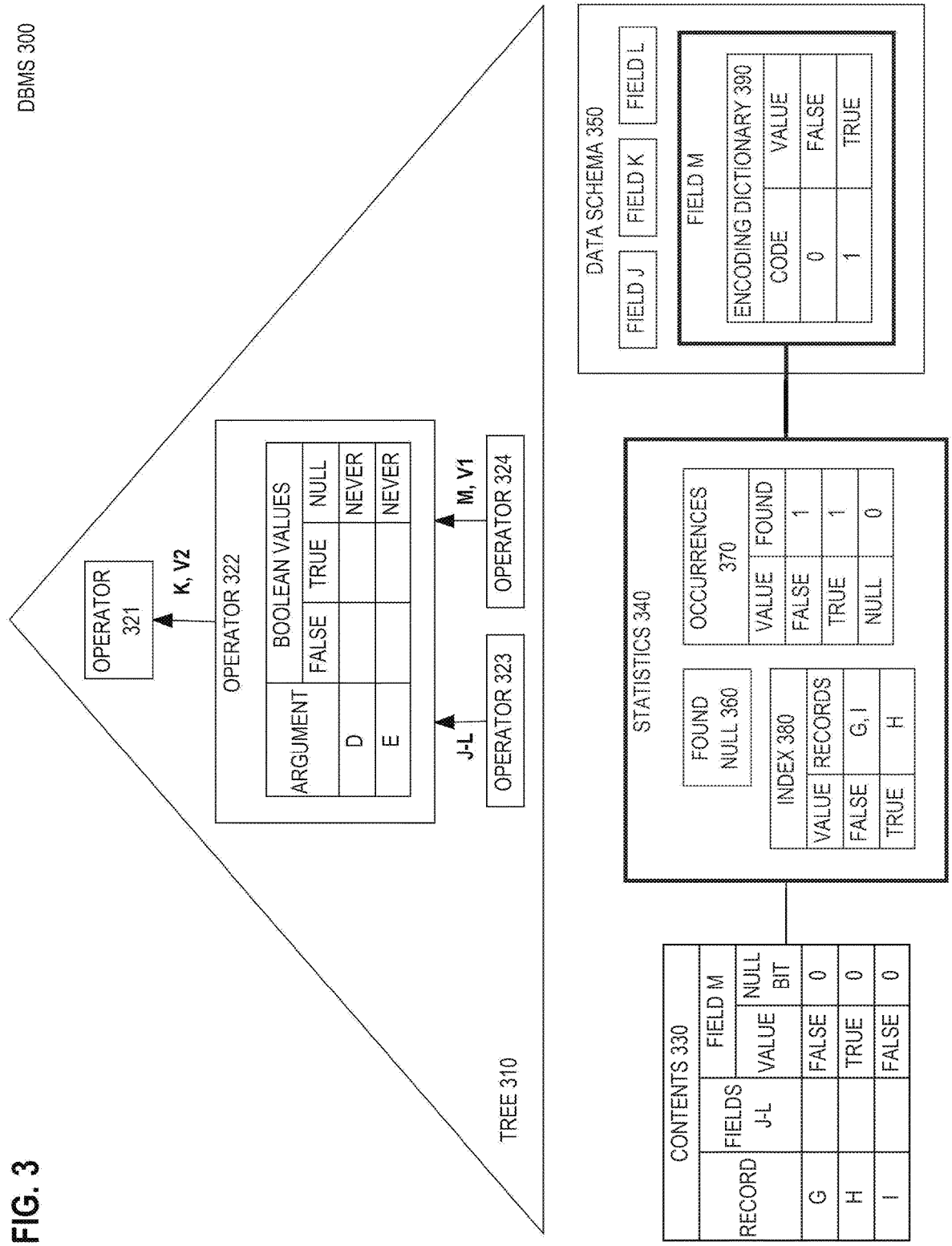
FIG. 3 is a block diagram that depicts an example database management system (DBMS) that uses various sources of metadata for applying value range analysis to a tree representation of a compound predicate.

FIG. 3 is a block diagram that depicts an example DBMS 300, in an embodiment. DBMS 300 uses various sources of metadata for applying value range analysis to a tree representation of a compound predicate. DBMS 300 may be hosted by a computer that is an implementation of computer 100.

Figure 4:
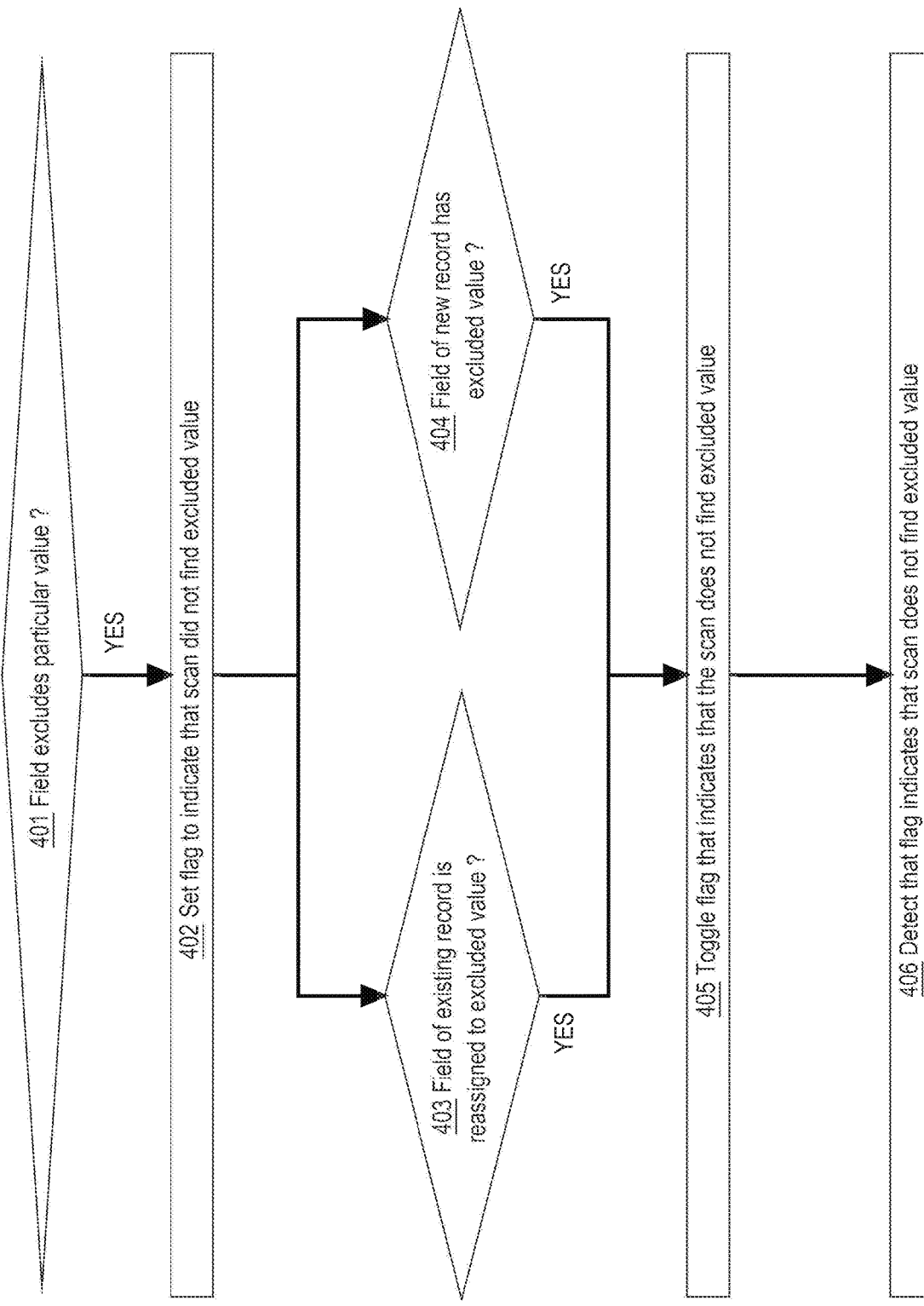
FIG. 4 is a flow diagram that depicts an example process for maintaining statistics by autonomously monitoring database contents, regardless of whether or not a DBMS receives a data access request.

FIG. 4 is a flow diagram that depicts an example process that maintains statistics 340 by autonomously monitoring contents 330, regardless of whether or not DBMS 300 receives a data access request for contents 330. For example as shown, steps 401-402 may occur before DBMS 300 receives any data access request. FIGS. 3-4 are discussed together as follows.

Expression tree 310 logically arranges, as a tree, operators 321-324 that occur in a compound predicate of a DML statement. Operators 321-324 are logically interconnected as a treelike dataflow graph such that data flows from leaf operators 323-324 through intermediate operator 322 to root operator 321. Logically, tree 310 may be arranged as levels such that operators 323-324 do not interoperate with each other. Operators 323-324 of a lower tree level produce data outputs that are connected into respective input arguments D-E of operator 322 at a higher tree level.

DBMS 300 may use any of contents 330, statistics 340, and data schema 350 to perform value range analysis. Data schema 350 provides static metadata about persistent aggregations of data such as definitions of fields J-M for records, tables, column families, and/or documents. For example, fields J-M may be columns of same or different relational tables.

For example no matter what datatype is field J defined as, data schema 350 may indicate that field J excludes null, which may affect value range analysis of field J per condition 706 in Table 5 below. For example, SQL DDL may define field J as NOT NULL. In an embodiment, if a field only stores distinct values such as with SQL's DISTINCT or UNIQUE, the field may automatically exclude null.

The following Table 5 enumerates conditions 701-706 from which DBMS 300 may deduce that a particular value is excluded, which may facilitate other activities presented herein. For example, some or all of conditions 701-706 may be used to implement step 401 and/or step 202 of FIG. 2.

| Condition | Meaning |
|---|---|
| 701 | Excluded value is absent in encoding dictionary or index |
| 702 | Excluded value is not found by scan of records |
| 703 | Excluded value is not found by single instruction multiple data (SIMD) |
| 704 | No bits of bit string have particular bit value that indicates excluded value |
| 705 | Field is candidate key or sequence |
| 706 | Data schema indicates that field excludes: particular value and/or duplicate values |

A range of values may be implicitly predefined for a datatype. In some cases, data schema 350 expressly limits a range to a subset of values. For example, true and false values are defined for field M in encoding dictionary 390 whose values are true and false. Condition 701 may detect that the values of encoding dictionary 390 excludes a particular value such as null. Similar value range analysis may instead be applied to an enumeration of values such as a SQL DDL ENUM.

In an embodiment, null exclusion may be inferred from semantics of a field's datatype per condition 705. For example, a primary key and/or another candidate key of records G-I may automatically exclude null in some embodiments. For example, all fields of a compound key may exclude null. Likewise, a sequence datatype such as a serial number may automatically exclude null.

Statistics 340 provides dynamic metadata about contents 330 and/or usage patterns of data access. DBMS 300 may dynamically maintain statistics 340 based on profiling logic that is instrumented more or less within data access mechanisms of DBMS 300. Such profiling may populate various data structures such as follows.

Found null 360 may be a flag that indicates, based on an inspection of content, whether or not field M contains at least one null value. For example during step 401, a full scan of field M such as during a table scan may detect whether or not field M excludes null per condition 702. In an embodiment, steps 401-402 autonomously occur before DBMS 300 receives a data access request.

In an embodiment that temporally decouples query compilation from query execution such as when a statement is prepared ahead of time, statement preparation may cause steps 401-402, and query execution may perform step 406. For example, steps 401-402 may occur in a background process that entails a table scan. Any data access request that scans the table may entail steps 401-402.

Found null 360 may initially be clear. If step 401 detects that field M excludes null, then step 402 may set found null 360.

During operation of DBMS 300, steps 403-404 monitor writes to field M by various data access requests. Step 403 detects whether or not field M of existing record(s) is reassigned to null in contradiction of found null 360 that indicated that null was not found. Likewise, step 404 detects whether or not field M is null for a new record being inserted into contents 330 in contradiction of found null 360 that indicated that null was not found.

In either case, writing null into field M causes step 405 that clears found null 360 to indicate that field M now contains null. Thus, found null 360 is adjusted for accuracy despite mutation of field M contents. Any data access request that writes field M may cause any or all of steps 403-405.

Subsequent value range analysis may inspect found null 360 to detect whether or not field M excludes null during step 406. For example, step 406 may entail receiving, compiling, and executing an ad hoc query.

Instead of, or in addition to, setting found null 360, the table scan may detect which values are actually stored in field M and record this in occurrences 370. In the shown embodiment, the found column of occurrences 370 flags which values of false, true, and null are actually stored in field M. In another embodiment, occurrences 370 is a histogram, and the found column counts how may occurrences of each value occur in field M.

In either case, DBMS 300 may inspect occurrences 370 to detect whether or not field M excludes null. For example, found null 360 may be derived from occurrences 370.

DBMS 300 may populate index 380 that indicates which records G-I of contents 330 have which Boolean value. For example, index 380 indicates that records G and I have false stored for field M. Index 380 may operate as a lookup table that uses its value column for keys. When the value column of index 380 excludes null, DBMS 300 may infer that field M excludes null based on condition 701. For example, occurrences 370 may be derived from index 380.

Contents 330 contains persistent records G-I, including application fields J-M. For example, record H stores true for field M. In an embodiment, null bit is an additional field that is derived from field M. For example, when a new record is inserted into contents 330, the record's null bit may be initialized according to the value of field M of the new record.

For example, null bit may be a column of individual bits that flag whether or not each respective records stores a null. As shown, none of records F-I store null in field M. Thus, the null bits are all cleared (i.e. zero).

In an embodiment, the bits of the null bit column may be analyzed in parallel with vector hardware such as with single instruction multiple data (SIMD). For example for a fixed amount of bits, such as with a central processing unit (CPU) register, SIMD may concurrently count how many bits are set or detect whether or not any bits are set per condition 704. In another example, SIMD directly inspects field M. For example when field M is one byte wide, a four byte SIMD register may simultaneously inspect field M in four records for null per condition 703. In any case, SIMD may accelerate population of occurrences 370 and/or found null 360 such as during a table scan.

DBMS 300 may use any of contents 330, statistics 340, and data schema 350 to perform value range analysis for leaf operators 323-324 and/or non-leaf operators that directly access fields J-M. However, non-leaf operators may receive any of fields J-M as propagated by value or by reference from operators of lower tree levels. For example as shown, operator 323 conducts fields J-L to operator 322.

In some cases, an operator expressly conducts only one value, which may be scalar or vector. Likewise, usually an argument expressly accepts only one value, which may be scalar or vector. However, additional scalar or vector values may be needed by other operator(s) that appear in the tree path that indirectly connects the operator, through some amount of tree levels, to root operator 321. Those additional values may be implicitly conducted up a tree path to or toward operator 321.

For example, some or all direct field access may be implicitly pushed down to operators at lower tree levels and then propagated up tree 310 to operators at higher levels that actually need those fields. For example: a) one relational table may contain fields J-L for which all direct table access is pushed down to operator 323, and b) another relational table may contain field M for which all direct table access is pushed down to operator 324. As shown and regardless of which fields operators 323-324 actually need, those fields may be conveyed to operator 322.

In addition to, or instead of, conveying fields, operators may calculate and convey scalar or vector values such as derived values V1-V2 as shown, regardless of whether V1-V2 are expressly expected as arguments by operators of higher tree levels. Value range analysis may entail some or all of conveyed data J-L and V1-V2 as well as semantics of some or all of operators 321-324. Thus, value analysis may analyze expression tree 310 as a dataflow diagram to detect datatypes and excluded values for inputs and outputs of each operator 321-324.

Thus, DBMS 300 may detect which of operators 321-324 may use fast implementations and which should instead use slow general operators. For example, field L may be consumed as argument D of operator 322, and derived value V1 may be consumed as argument E of operator 322. Value range analysis may accordingly reveal that arguments D-E exclude null. Thus, a fast implementation of operator 322 may be used to accelerate predicate execution.

Value range analysis for one operator may propagate up tree 310 for analyzing operators at higher levels. For example, additional value constraints may be deduced based on detecting that arguments D-E exclude null. For example due to semantics of operator 322, DBMS 300 may detect that when arguments D-E exclude null, then output of operator 322 also excludes null.

Value range analysis may also propagate from one operator to another, upward in tree 310. For example because output of operator 322 excludes null, input to operator 321 also excludes null. Thus, both of operators 321-322 may use fast implementations. Thus, execution of expression tree 310 may be accelerated by invoking fast implementations of various operators.

5.0 Example Value Range Analysys

The following Table 6 enumerates conditions 711-713 that facilitate value range analysis.

| Condition | Meaning |
| --- | --- |
| 711 | All arguments of operator exclude particular value |
| 712 | Second operator will not produce the particular value |
| 713 | At least one projected field excludes particular value |

In an embodiment for value range analysis, conditions 711 and/or 712 may be statically detected such as during query planning. Condition 711 may be detected before detecting the actual value of any argument of an operator. That is, condition 711 may be detected before input values are available for the arguments of the operator. Condition 711 detects whether or not one, some, or all arguments of the operator exclude a particular value.

A compound predicate may have interconnected operators. Condition 712 may be detected before executing the implementation of an operator. Condition 712 detects whether or not an output of the operator excludes a particular value. For example, that output may be conveyed as input to another operator. Thus, value range analysis may have transitivity that may propagate value constraints upward in tree 310.

The following Table 7 enumerates activities 721-724 that facilitate value range analysis.

| Activity | Meaning |
| --- | --- |
| 721 | Associate respective set of projected fields with each operator |
| 722 | Post order tree traversal |
| 723 | Traverse operators as tree that does not contain particular operator as leaf |
| 724 | Depth first tree traversal |

Activity 721 may be preparation for condition 713. Activity 721 associates, as inputs or outputs, a respective set of projected fields with each operator of tree 310. Projected fields such as J-M and/or derived values V1-V2 may be designated as inputs or outputs of particular operators.

Condition 713 may detect that data J-M and/or V1-V2 exclude a particular value. Some or all detected exclusions may be propagated upward in tree 310. For example as shown, field K may be loaded by operator 323, relayed through operator 322, and consumed by operator 321. Thus, value range analysis of field K for operator 323 may propagate to improve value range analysis of field K and value V2 at operator 321.

Propagation of value range analysis may depend on how operators 321-324 are interconnected. For example, value range analysis may depend on which operators provide which outputs that supply which inputs of which other operators. For example, operators 321-324 may be arranged as logical tree 310.

Various ways of traversing tree 310, such as activities 722-724, may facilitate propagating value range analysis as follows. Activity 722 propagates value range analysis during a post order traversal of tree 310 in which value range analysis propagates upwards from leaf operators 323-324 and potentially reaching all the way to root operator 321. For example as shown, field K may be loaded by operator 323, relayed through operator 322, and consumed by operator 321. Thus, value range analysis of field K for operator 323 may propagate to improve value range analysis of field K and value V2 at operator 321. Post order traversal entails analyzing a particular operator after analyzing all operators the provide inputs to that particular operator.

Activity 723 propagates value range analysis through multilevel tree 310 that may contain intermediate operator 322 that is neither a leaf nor the root of tree 310. For example as shown, field K may be loaded by operator 323, relayed through operator 322, and consumed by operator 321. Activity 724 propagates value range analysis during a depth first traversal of tree 310 that may entail post, pre, or in order tree traversal, so long as a currently traversed branch of tree 310 is completely traversed to the branch's leaf operator(s) before traversing another branch.

The following Table 8 enumerates some operator implementation scenarios.

| Scenario | Meaning |
| --- | --- |
| 731 | Distribute value range analysis and operator implementation to hardware |
| 732 | Implement an operator using at most one branch instruction |

In scenario 731, value range analysis for an operator may be topologically decoupled from a deployed implementation of the operator. For example, an implementation of an operator may be installed on a network element and/or computing device that is separate from another network element and/or computing device that performs some or all value range analysis for that operator, such as detecting that an input or output of the operator excludes a particular value such as null. For example, rich analysis of value ranges may occur in a DBMS that is hosted on one computer, and execution of some or all operators may be offloaded to a separate appliance. For example, the DBMS may detect that a table scan for values of a column will exclude null, even though the table scan may be offloaded to a separate storage computer, such as with a smart scan by an Oracle Exadata storage computer.

Scenario 732 implements an operator using at most one branch instruction of an instruction set architecture (ISA). For example, an argument with three possible values may need two branch instructions to implement three respective control flow paths for the three values. When value range analysis detects that one of the three possible values is excluded, then only one branch instruction is needed to implement two respective control flow paths of the remaining two possible values. Reducing an amount of branches may avoid latency due to a CPU pipeline stall due to failures of branch prediction and/or speculative execution.

6.0 Exemplary Embodiment

The following exemplary embodiment includes algorithms and various design choices. This exemplary embodiment may be based on some of the techniques and embodiments presented earlier herein. Requirements of this exemplary embodiment need not be requirements of embodiments presented earlier herein.

6.1 Example Null Value Analysis

An attribute may be defined as follows. An attribute represents a column or an expression. A tuple is a mapping from a set of attribute names to their corresponding values. An attribute is designated as Null-able if possible corresponding values could be Null. An attribute is non-Null-able if Null values are expressly, impliedly, or inferentially not allowed. In an embodiment, a non-composite primary key consists of one attribute whose values cannot be Null. Thus a non-composite primary key is a non-Null-able attribute. Besides primary keys, the SQL standard defines a non Null constraint. Thus, columns of tables that are defined non Null cannot contain Null values. Hence such a column is a non-Null-able attribute.

An embodiment may exploit such schema information, such as while detecting whether or not a logical (sub-) expression can be evaluated by a two-valued logical primitive. Some Non-Null-able attribute characteristics may be gathered as follows:

from primary key constraints and Not-Null constraints analyzing columns that do not fall into the above category and checking if they contain Null values. This information could be stored in a database dictionary. One possibility of gathering this type of information is while loading a base table into main memory, such as loading some or all columns of a base table into an in-memory column store.

However, the above information gatherings only reveal whether or not a base table attribute is Null-able. The following is an example algorithm that infers similar information for intermediate result attributes. The main idea is to analyze each query plan operator and infer, for each attribute in the projection list of the operator, whether it is Null-able or not. The example algorithm has the following steps and sub-steps:

1. Gather the Null-able characteristics for each base table attribute:
   a. For each table access, i.e. table scan or index scan, iterate over the projection list.
   b. If the current projection list entry is a single attribute, i.e. an expression tree of height one, check if the base table attribute is Null-able or not. Explained above is how to gather base table attribute Null-able characteristics.
   c. In case the current projection list entry is more complex, it is an expression, where the height of its expression tree is larger than one. The root of the expression tree forms a new attribute, which may subsequently be treated as a base table attribute even though it has been derived. For inferring the Null-able characteristics of the root attribute, there are two possible avenues. A straightforward solution is to mark the root of the expression tree as Null-able, which is the most conservative choice. However a more sophisticated solution is to infer the Null-able characteristics for the root of the expression tree. The leaves of the expression tree are either a constant, a parameter, or a base table attribute. Depending on the type of expression nodes that consume output of the leaves, the Null-able information can be deduced for that node and so forth. In most of the cases the intermediate expression node is Null-able if at least one of its input nodes is Null-able.

2. Traverse the plan operator tree in a depth-first manner, and ignore the leaf operators that are table accesses.
3. For each plan operator analyze its projection list:
   a. If the projection lists entry corresponds to an expression tree of height one . . .
      i. . . . and is a constant, mark the attribute as non-Null-able, except if the constant is null, then mark as a Null-able.
      ii. . . . and is a parameter, mark the attribute as Null-able.
      iii. . . . otherwise, try to trace the attribute back to an input of one of the plan operators. Mark the attribute according to the Null-able characteristics of the projection list attribute of the input operator.
   b. If the projection lists entry corresponds to an expression tree of height larger than one, than there are two possible solutions:
      i. Either, make a conservative choice and mark the attribute which represents the root of the expression tree as Null-able.
      ii. Or, analyze the leaves of the expression tree, according to above characteristics of expression trees of height one. After that, apply Logical Expression Analysis (as explained later herein) to infer the Null-able characteristics of the root node.

After Null-able Attribute Analysis is run for the compiled plan of a query, the Null-able characteristics of each attribute that each plan operator produces has become known, which can be exploited when analyzing the feasibility of using two-value logic operators for predicates and expressions as follows.

6.2 Example Logical Expression Analysis

The following Logical Expression Analysis occurs for WHERE, WHEN, and HAVING clauses of all lexical blocks of a query. All those clauses evaluate the root of their corresponding trees and check if respective results are true, which is more involved than merely checking that such results are not false. Hence the logical values of False or Unknown will fail the check. Replacement of three-valued logic of the expression tree with two-valued logic occurs as follows, which entails inferring if all input attributes are non-Null-able and all intermediate expression nodes up to the root are not producing any Null/Unknown values.

For example, an equi-join predicate may be: R1.a=R2.b, where the attributes R1.a and R2.b have been determined as non-Null-able by the Null-able Attribute Analysis presented earlier herein. Thus there is no combination of possible input values for R1.a and R2.b that would allow= to evaluate to Unknown. Hence instead of evaluating= with a three-value logic, faster two-value logic may be used instead.

Logical Expression Analysis entails the following steps:
1. Process the expression through a depth-first traversal.
2. If the expression node is a leaf node, trace the Null-able characteristics to the projection list of one of the plan operators input plan operator. If it is a constant that is not NULL, mark it as non-Null-able otherwise or if it is a parameter marker, mark it as Null-able.
3. If the expression node is an intermediate node, determine by the expression type if given its input attributes it can evaluate to Null/Unknown.
   a. If the expression type is a comparison, e.g <, <=, =, >= or > mark the node as non-Null-able if both input nodes have been marked as non-Null-able. Mark it Null-able otherwise.
   b. If the expression type is Not, i.e. !, mark the expression node the same as the input node.

c. If it is an arithmetic node, e.g. +, x, /, mark it as non-Null-able if the input expression nodes have been all marked as non-Null-able. Mark it Null-able otherwise.
d. If the expression node is a scalar user defined function (UDF) mark the node as Null-able.
e. If the expression is a built-in scalar function, mark it according to the the predefined scalar function characteristics. These characteristics may be stored in a predefined look-up table. For the analysis, the Null-able characteristics of the input attributes are considered.
f. If the expression node is a CASE expression mark it as non-Null-able only if the input expression-nodes are marked non-Null-able, mark it Null-able otherwise.
g. If the expression node does not fit in the above cases, conservatively mark it as Null-able.

6.3 Example Query Plan Generator Integration

Null-able Attribute Analysis presented earlier herein may occur once per query. For each predicate, the above Logical Expression Analysis occurs. Both of those analyses occur after the plan operator tree has been constructed. When building the query execution plan, two-valued logic is used for every expression node that has been marked as non-Null-able, and three-value logic is used for all the other expression nodes.

7.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

7.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
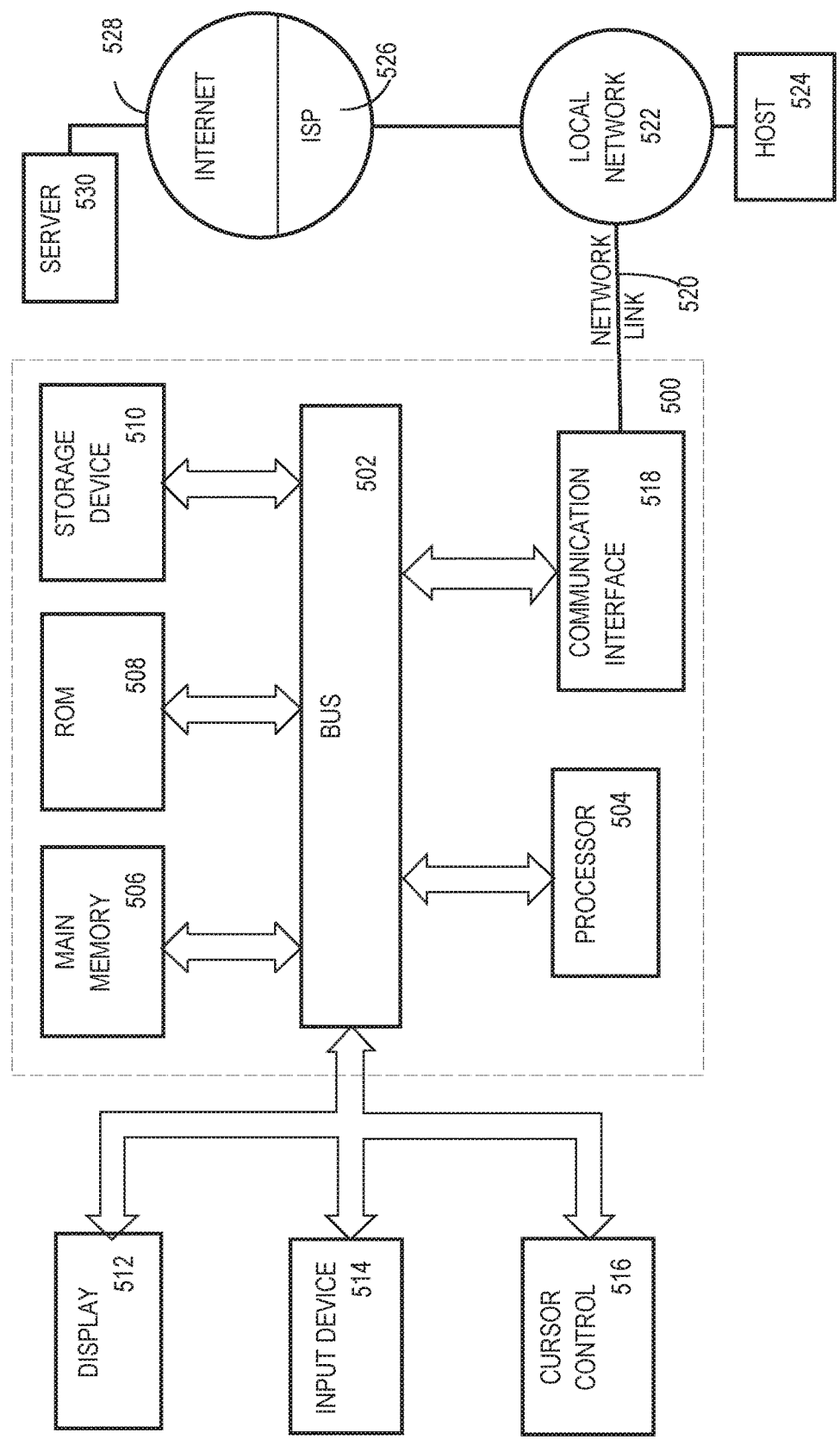
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

SOFTWARE OVERVIEW

Figure 6:
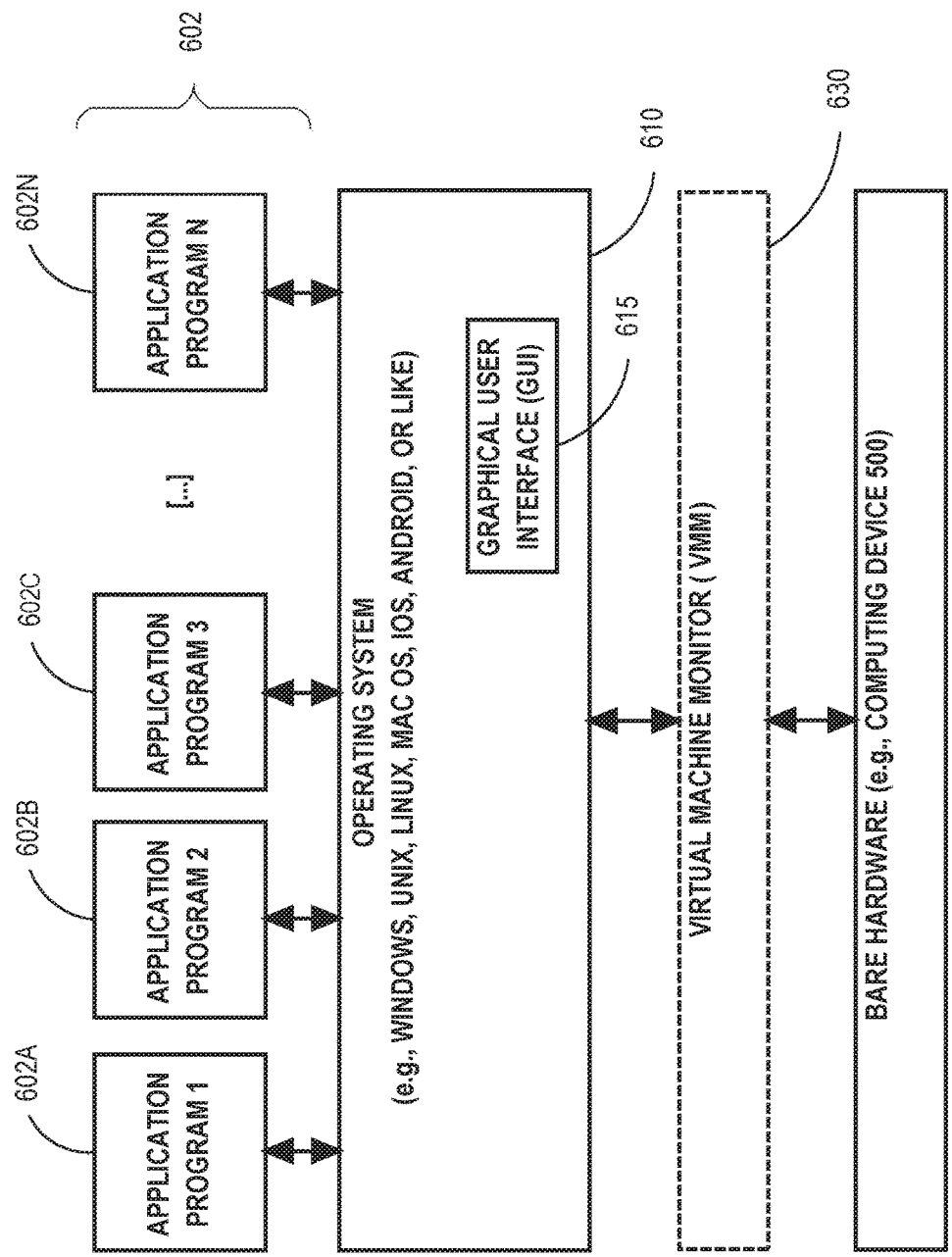
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 600 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a data access request that specifies an expression that includes one or more operators that include a particular operator that has a plurality of arguments, wherein each argument of the plurality of arguments has only three possible values;
   detecting, before detecting actual values of the plurality of arguments, that a particular value of the three possible values is excluded for the plurality of arguments;
   selecting, based on said detecting that the particular value is excluded, an implementation of the particular operator that never accepts the particular value for the plurality of arguments;
   fulfilling, by a database management system (DBMS), the data access request, including applying the expression and invoking said implementation of the particular operator.

2. The method of claim 1 wherein said detecting that the particular value is excluded comprises at least one selected from the group consisting of:
   detecting, before invoking a second operator of the one or more operators, that the second operator will not produce the particular value, and
   traversing the one or more operators as a tree that does not contain the particular operator as a leaf.

3. The method of claim 1 wherein:
   said detecting that the particular value is excluded comprises traversing the one or more operators as a tree;
   said traversing the the one or more operators as the tree comprises at least one selected from the group consisting of: a post order traversal and a depth first traversal.

4. The method of claim 1 wherein said detecting that the particular value is excluded comprises:
   associating a respective set of projected fields with each operator of the one or more operators;
   detecting that at least one projected field of the set of projected fields of at least one operator of the one or more operators excludes the particular value.

5. The method of claim 1 wherein at least one selected from the group consisting of:
   the particular value is null, and
   the particular operator produces a Boolean.

6. The method of claim 1 wherein:
   each record of a plurality of records has a same field;
   said detecting that the particular value is excluded comprises detecting at least one selected from the group consisting of:
   said field is a candidate key or a sequence, and
   a data schema indicates that said field excludes duplicate values.

7. The method of claim 6 wherein said detecting that the field excludes the particular value comprises:
   setting, before said receiving the data access request, a flag to indicate that a particular scan does not find the particular value, wherein said particular scan is one selected from the group consisting of:
   a scan of the plurality of records, and
   a scan by a single instruction multiple data (SIMD);
   detecting that the flag indicates that the particular scan does not find the particular value.

8. The method of claim 7 further comprising toggling said flag that indicates that the particular scan does not find the particular value when one selected from the group consisting of:
   said field of a record of the plurality of records is reassigned to the particular value, and
   said field of a new record that is added to the plurality of records has the particular value.

9. The method of claim 1 wherein separate network elements or separate computers respectively perform:

in said DBMS, said detecting that the particular value is excluded, and not in the DBMS, said invoking said implementation of the particular operator.

10. The method of claim 1 wherein said invoking said implementation of the particular operator comprises executing at most one branch instruction of an instruction set architecture (ISA).

11. A method comprising:
receiving a data access request that specifies an expression that includes one or more operators that include a particular operator that has at least one argument that has only three possible values;
detecting, before detecting an actual value of a particular argument of the at least one argument, that a particular value of the three possible values is excluded for the particular argument, wherein said detecting that the particular value is excluded comprises detecting one selected from the group consisting of:
the particular value is not contained in an encoding dictionary or an index,
the particular value is not found by a scan of a plurality of records or by a single instruction multiple data (SIMD), and
no bits of a bit string have a particular bit value
selecting, based on said detecting that the particular value is excluded, an implementation of the particular operator that never accepts the particular value for the particular argument;
applying the expression, including invoking said implementation of the particular operator, to fulfil the data access request.

12. One or more non-transitory computer-readable media storing instructions that, when executed by one or more processors, cause:
receiving a data access request that specifies an expression that includes one or more operators that include a particular operator that has a plurality of arguments, wherein each argument of the plurality of arguments has only three possible values;
detecting, before detecting actual values of the plurality of arguments, that a particular value of the three possible values is excluded for the plurality of arguments;
selecting, based on said detecting that the particular value is excluded, an implementation of the particular operator that never accepts the particular value for the plurality of arguments;
applying the expression, including invoking said implementation of the particular operator, to fulfil the data access request.

13. The one or more non-transitory computer-readable media of claim 12 said detecting that the particular value is excluded comprises at least one selected from the group consisting of:
detecting, before invoking a second operator of the one or more operators, that the second operator will not produce the particular value, and
traversing the one or more operators as a tree that does not contain the particular operator as a leaf.

14. The one or more non-transitory computer-readable media of claim 12 wherein said detecting that the particular value is excluded comprises:
associating a respective set of projected fields with each operator of the one or more operators;
detecting that at least one projected field of the set of projected fields of at least one operator of the one or more operators excludes the particular value.

15. The one or more non-transitory computer-readable media of claim 12 wherein at least one selected from the group consisting of:
the particular value is null, and
the particular operator produces a Boolean.

16. The one or more non-transitory computer-readable media of claim 12 wherein:
each record of a plurality of records has a same field;
said detecting that the particular value is excluded comprises detecting at least one selected from the group consisting of:
said field is a candidate key or a sequence, and
a data schema indicates that said field excludes duplicate values.

17. The one or more non-transitory computer-readable media of claim 16 wherein said detecting that the field excludes the particular value comprises:
setting, before said receiving the data access request, a flag to indicate that a particular scan does not find the particular value, wherein said particular scan is one selected from the group consisting of:
a scan of the plurality of records, and
a scan by a single instruction multiple data (SIMD);
detecting that the flag indicates that the particular scan does not find the particular value.

18. The one or more non-transitory computer-readable media of claim 17 wherein the instructions further cause toggling said flag that indicates that the particular scan does not find the particular value when one selected from the group consisting of:
said field of a record of the plurality of records is reassigned to the particular value, and
said field of a new record that is added to the plurality of records has the particular value.

19. The one or more non-transitory computer-readable media of claim 12 wherein separate network elements or separate computing devices respectively perform:
said detecting that the particular value is excluded, and
said invoking said implementation of the particular operator.

20. One or more non-transitory computer-readable media storing instructions that, when executed by one or more processors, cause:
receiving a data access request that specifies an expression that includes one or more operators that include a particular operator that has at least one argument that has only three possible values;
detecting, before detecting an actual value of a particular argument of the at least one argument, that a particular value of the three possible values is excluded for the particular argument, wherein said detecting that the particular value is excluded comprises detecting one selected from the group consisting of:
the particular value is not contained in an encoding dictionary or an index,
the particular value is not found by a scan of a plurality of records or by a single instruction multiple data (SIMD), and
no bits of a bit string have a particular bit value said field is a candidate key or a sequence, or
selecting, based on said detecting that the particular value is excluded, an implementation of the particular operator that never accepts the particular value for the particular argument;

applying the expression, including invoking said implementation of the particular operator, to fulfil the data access request.

\* \* \* \* \*

UNITED STATES PATENT AND TRADEMARK OFFICE
CERTIFICATE OF CORRECTION

| | | |
|---|---|---|
| PATENT NO. | : 11,269,874 B2 | Page 1 of 1 |
| APPLICATION NO. | : 16/823632 | |
| DATED | : March 8, 2022 | |
| INVENTOR(S) | : Fender et al. | |

It is certified that error appears in the above-identified patent and that said Letters Patent is hereby corrected as shown below:

On the Title Page

On page 2, Column 1, under Other Publications, Line 10, delete "Graete," and insert -- Graefe, --, therefor.

On page 2, Column 1, under Other Publications, Line 10, delete "tor" and insert -- for --, therefor.

In the Specification

In Column 11, Line 13, delete "Analysys" and insert -- Analysis --, therefor.

In Column 15, Line 8, delete "the the" and insert -- the --, therefor.

In the Claims

In Column 22, Line 26, in Claim 3, delete "the the" and insert -- the --, therefor.

In Column 24, Lines 62-63, in Claim 20, after "value" delete "said field is a candidate key or a sequence, or" and insert --;--, therefor.

Signed and Sealed this
Second Day of August, 2022

Katherine Kelly Vidal
*Director of the United States Patent and Trademark Office*